US009588344B2

United States Patent
Chen et al.

(10) Patent No.: US 9,588,344 B2
(45) Date of Patent: Mar. 7, 2017

(54) HEAD-MOUNT DISPLAY WITH EXERCISE INFORMATION DISPLAYED THEREON

(71) Applicant: BION INC., New Taipei (TW)

(72) Inventors: Shui-Jung Chen, New Taipei (TW); Wen-Pin Weng, New Taipei (TW)

(73) Assignee: BION INC., New Taipei (TW)

( * ) Notice: Subject to any disclaimer, the term of this patent is extended or adjusted under 35 U.S.C. 154(b) by 86 days.

(21) Appl. No.: 14/632,083

(22) Filed: Feb. 26, 2015

(65) Prior Publication Data

US 2015/0253571 A1    Sep. 10, 2015

(30) Foreign Application Priority Data

Mar. 7, 2014   (TW) .............................. 103107795 A (51) Int. Cl.
*G02B 27/01*    (2006.01)

(52) U.S. Cl.
CPC ....... *G02B 27/017* (2013.01); *G02B 27/0172* (2013.01); *G02B 2027/014* (2013.01); *G02B 2027/0143* (2013.01); *G02B 2027/0178* (2013.01)

(58) Field of Classification Search
CPC .............. G02B 27/017; G02B 27/0172; G02B 2027/0178
See application file for complete search history.

(56) References Cited

U.S. PATENT DOCUMENTS

| | | | | |
|---|---|---|---|---|
| 2012/0018989 | A1* | 1/2012 | Breed | B60R 21/01516 280/735 |
| 2012/0120498 | A1* | 5/2012 | Harrison | G02B 3/08 359/630 |
| 2013/0009993 | A1* | 1/2013 | Horseman | G06F 19/3418 345/633 |
| 2013/0214998 | A1* | 8/2013 | Andes | G02B 27/017 345/8 |
| 2014/0002587 | A1* | 1/2014 | Aguren | H04N 13/044 348/36 |
| 2014/0098137 | A1* | 4/2014 | Fein | G06F 3/048 345/633 |
| 2014/0168264 | A1* | 6/2014 | Harrison | G02B 27/0176 345/633 |
| 2014/0300859 | A1* | 10/2014 | Oz | G02B 27/225 351/201 |
| 2015/0235426 | A1* | 8/2015 | Lyons | G02B 27/0172 345/8 |

\* cited by examiner

*Primary Examiner* — Ricardo L Osorio
(74) *Attorney, Agent, or Firm* — patenttm.us (57) ABSTRACT

A head-mount display with exercise information displayed thereon includes an information box securely mounted on one temple of a frame, at least one wireless receiving unit mounted inside the information box, and a transparent body mounted on one front end of the information box in a visual range of a user. A display screen is mounted on an outer sidewall of the transparent body to display exercise information in the form of icon or text message, which is detected by the at least one wireless receiving unit. A magnifying lens is mounted on an inner sidewall of the transparent body to enlarge information displayed on the display screen as a virtual image for the user to view upon exercising. Accordingly, the head-mount display not only provides convenience in demonstrating information but also enhances space utilization efficiency of the display screen and recognition of exercise information on the display screen.

8 Claims, 13 Drawing Sheets

HEAD-MOUNT DISPLAY WITH EXERCISE INFORMATION DISPLAYED THEREON

BACKGROUND OF THE INVENTION

1. Field of the Invention

The present invention relates to a heat-mount display and, more particularly, to a head-mount display with exercise information displayed thereon.

2. Description of the Related Art

Among a multitude of head-mount displays in the market, one of them is Google Glass™. The Google Glass™ can display images in front of users' eyes without requiring additional fixed or handheld display. Users can interact with the Google Glass™ through voice control to easily display various types of information, such as time, weather, schedule, electronic atlas and the like in daily life for users' references.

Figure 9:
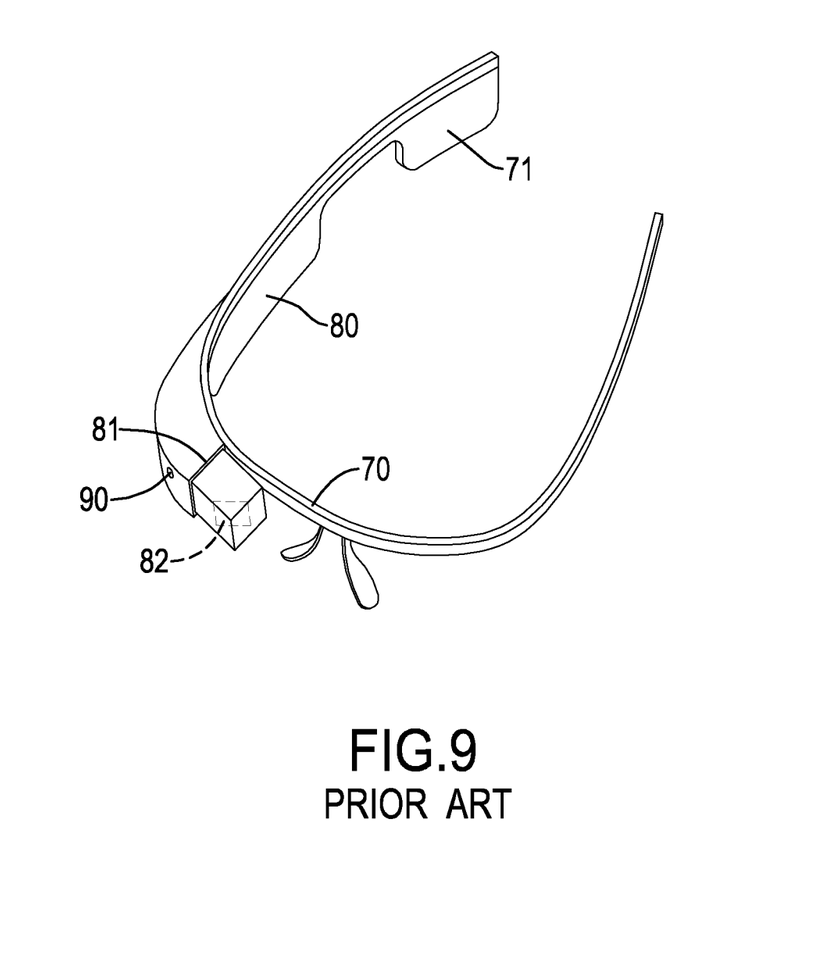
FIG. 9 is a perspective view of a conventional Google Glass™.

With reference to FIG. 9, a Google Glass™ includes a head-mount frame 70, an electronic device 80, and a camera 90. The head-mount frame 70 has two temples. The electronic device 80 and the camera 90 are mounted on one of the two temples. The electronic device 80 is connected to the camera 90. The head-mount frame 70 is hollow for reserving space for wiring, and has two earpieces for respectively fixing the Google Glass™ on the two earflaps of a user. One of the earpieces 71 has a rechargeable battery therein electrically connected to the electronic device 80 to supply an operating power to the electronic device 80. The electronic device 80 has multiple driving circuits and a mini-projector 81. The mini-projector 81 projects images onto a virtual display screen 82 through the driving circuits. The virtual display screen 82 is a translucent prism reflecting the images projected from the mini-projector 81 to the retina of the user wearing the Google Glass™. Because the electronic device 80 is mounted on one temple of the head-mount frame 70, the virtual display screen 82 can be positioned in an upper half portion of the user's angle of view. When the user looks up, the images projected from the mini-projector 81 can be seen. When the user looks straight ahead, the user's view will not be interfered by the images on the virtual display screen 82.

Another pair of conventional eyeglasses capable of receiving and displaying external information includes a first housing, a second housing, and a frame. The first housing and the second housing are respectively mounted on two temples of the frame, and are electrically connected to each other. The first housing has a transducer and a receiver. The transducer serves to sense a moving state of a user wearing the eyeglasses. The receiver serves to receive information transmitted from external equipment, such as mobile phones, GPS device, and the like. The second housing has a magnifying lens serving to display a screen corresponding to the received information for users to view.

Despite the capabilities of performing navigation, searching for information, receiving emails, uploading images and the like through a network environment, and being portable, the foregoing Google Glass™ and eyeglasses are still bulky and rely too much on network environment, and are expensive and not cost-effective. To people fond of exercise, carrying a bulky and costly Google Glass™ without being able to freely stretch and exercise like cycling, running, climbing, hiking and the like becomes a burden during exercise. When there is no network environment at all or when the user is doing exercise in a mountain area, convenience brought forth by the Google Glass™ thus has no chance of using its might. Additionally, high cost of the mini-projector in the Google Glass™ further raises the threshold in presenting the Google Glass™ as a consumer electronic product.

SUMMARY OF THE INVENTION

An objective of the present invention is to provide a head-mount display with exercise information displayed thereon, which can be produced with low manufacturing cost, and displays exercise information of a user upon exercising to enhance operational convenience.

To achieve the foregoing objective, the head-mount display with exercise information displayed thereon includes a frame, an information box, a transparent body, a display screen, and a magnifying lens.

The frame has two temples respectively connected to two ends of the frame.

The information box is mounted on one of the two temples, and has at least one wireless receiving unit and a display unit.

The at least one wireless receiving unit wirelessly detects multiple pieces of exercise information associated with a user.

The display unit displays the multiple pieces of exercise information in a form of icon or text message.

The transparent body has an inner sidewall and an outer sidewall. The inner sidewall faces an upper portion of an angle of view of the user. The outer sidewall is opposite to the inner sidewall.

The display screen is mounted on the outer sidewall of the transparent body, is electrically connected to the display unit, and displays images that are viewable to the user through the inner sidewall of the transparent body.

The magnifying lens is mounted on the inner sidewall and serves to enlarge the multiple pieces of exercise information displayed on the display screen.

The head-mount display can simultaneously detect exercise information of the user pertinent to temperature, moving speed, physiological data and the like through the wireless receiving unit inside the information box, and displays the exercise information on the display screen in the form of icons or text messages. The exercise information displayed on the display screen is further enlarged by the magnifying lens to make the exercise information more readable. In addition to operational convenience, the head-mount display further enhances the amount of exercise information displayed on the display screen with better space utilization efficiency.

Other objectives, advantages and novel features of the invention will become more apparent from the following detailed description when taken in conjunction with the accompanying drawings.

DETAILED DESCRIPTION OF THE INVENTION

Figure 1:
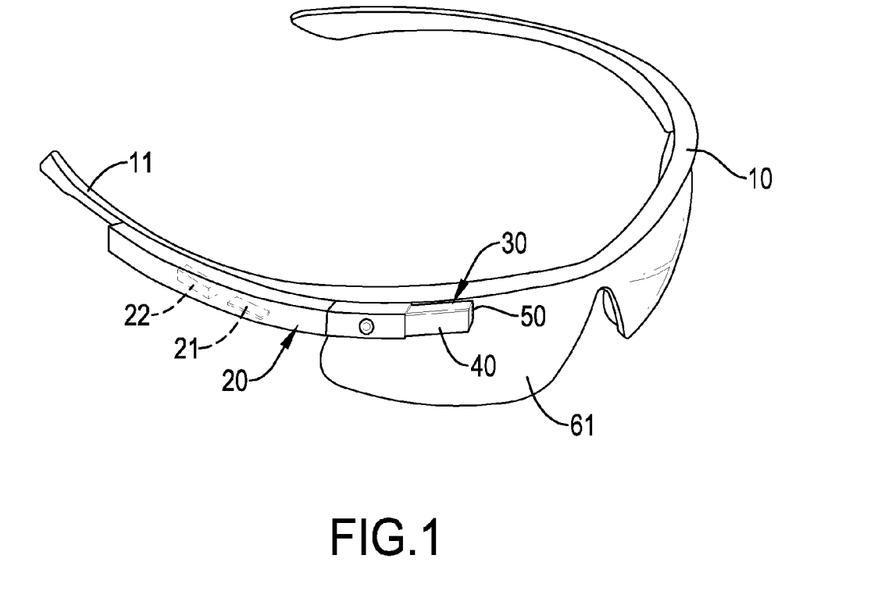
FIG. 1 is a perspective view of a head-mount display with exercise information displayed thereon in accordance with the present invention.

With reference to FIG. 1, a head-mount display with exercise information displayed thereon in accordance with the present invention includes a frame 10, an information box 20, and a transparent body 30.

The frame 10 has two temples 11 respectively connected to two ends of the frame 10. The information box 20 is mounted on an outer sidewall of one of the two temples 11, and has a substrate 21 and a rechargeable battery 22 mounted therein. The rechargeable battery 22 is electrically connected to the substrate 21 to supply an operating power required by the information box 20. The substrate 21 has at least one wireless receiving unit and a display unit. The at least one wireless receiving unit wirelessly detects multiple pieces of exercise information associated with a user. The display unit then displays the multiple pieces of exercise information through the use of icon or text message. The icon or text message may be formed by small pixels.

The transparent body 30 has an inner sidewall and an outer sidewall. In the present embodiment, the inner sidewall faces an upper portion of an angle of view of the user, and the outer sidewall is opposite to the inner sidewall. The head-mount display further has a display screen 40 and a magnifying lens 50. The display screen 40 is mounted on the outer sidewall of the transparent body 30, is electrically connected to the display unit, and displays images that are viewable to the user through the inner sidewall of the transparent body 30. The magnifying lens 50 is mounted on the inner sidewall and serves to enlarge the exercise information taking the form of icons or text messages and displayed on the display screen 40. In the present embodiment, the transparent body 50 is made of a glass material or an acrylic material.

Figure 2A:
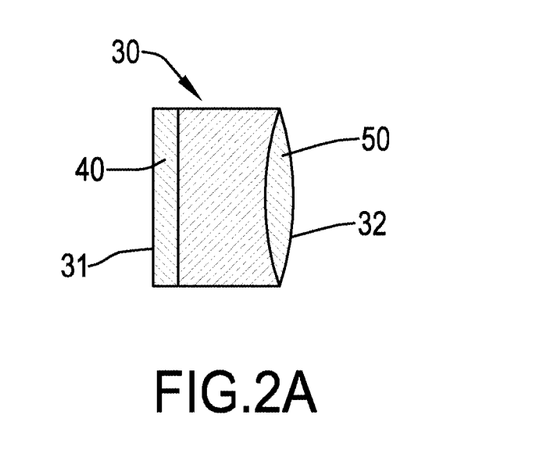
FIG. 2A is a partial cross-sectional view of an embodiment of a head-mount display with exercise information displayed thereon in accordance with the present invention.

With reference to FIG. 2A, an embodiment of the transparent body 30 is a hollow and transparent case, and has a first fixing portion 31 and a second fixing portion 32. The first fixing portion 31 is formed on an inner side of the outer sidewall of the transparent body 30, and the second fixing portion 32 is formed on an inner side of the inner sidewall of the transparent body 30. The first fixing portion 31 and the second fixing portion 32 respectively match a surface of the display screen 40 contacting the first fixing portion 31 and a surface of the magnifying lens 50 contacting the second fixing portion 32. Hence, when the display screen 40 is joined to the first fixing portion 31 and the magnifying lens 50 is joined to the second fixing portion 32, the display screen 40 and the magnifying lens 50 are securely mounted inside the transparent body 30. In the present embodiment, the magnifying lens 30 is a biconvex magnifying lens.

Figure 2B:
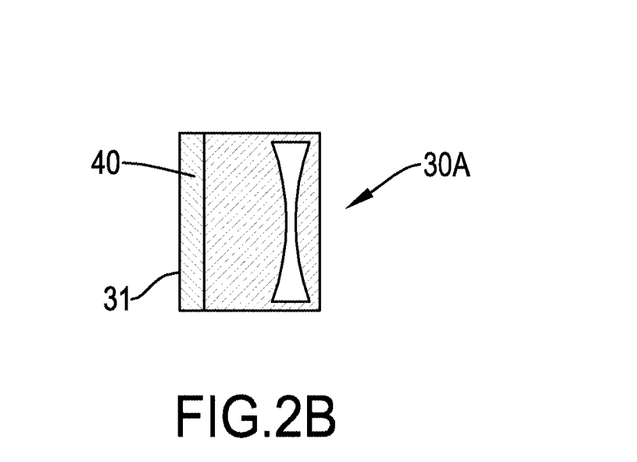
FIG. 2B is a partial cross-sectional view of another embodiment of a head-mount display with exercise information displayed thereon in accordance with the present invention.

With reference to FIG. 2B, another embodiment of the transparent body 30 is substantially the same as the foregoing embodiment except that the transparent body 30 is solid and a hollow space is formed inside the transparent body 30, is adjacent to the inner sidewall of the transparent body 30, and takes a form of a biconcave magnifying lens. As the hollow space has two concave surfaces on two respective opposite sides thereof, the hollow space has the same effect of enlarging images on the virtual screen as that done by the magnifying lens 30 in the foregoing embodiment.

The information box 20 can wirelessly receive or wirelessly detect multiple pieces of exercise information, such as moving speed, moving displacement, geographical location, temperature, heartbeat and the like of the user, and displays the multiple pieces of exercise information on the display screen 40 using icons or text messages. The magnifying lens 50 further enlarges the multiple pieces of information on the display screen 40 for the user to view upon exercising. To explain the information box 20 in detail, with reference to FIG. 3A, an embodiment of a head-mount display in accordance with the present invention is shown, and the substrate 21 inside the information box 20 further has a microcontroller unit (MCU) 23. The MCU 23 is electrically connected to the display unit 24 and the wireless receiving unit 29 on the substrate 21, receives multiple sensing signals respectively detected by multiple external sensors, transmits the sensing signals to the MCU 23, converts the multiple sensing signals into multiple pieces of exercise information in the form of icons and text messages to the display unit 24, and instructs the display unit 24 to drive the display screen 40. The display unit 24 may be a liquid crystal diode (LCD), a light-emitting diode (LED), or an organic LED (OLED) display unit. The display screen 40 may be an LCD display screen.

Figure 3A:
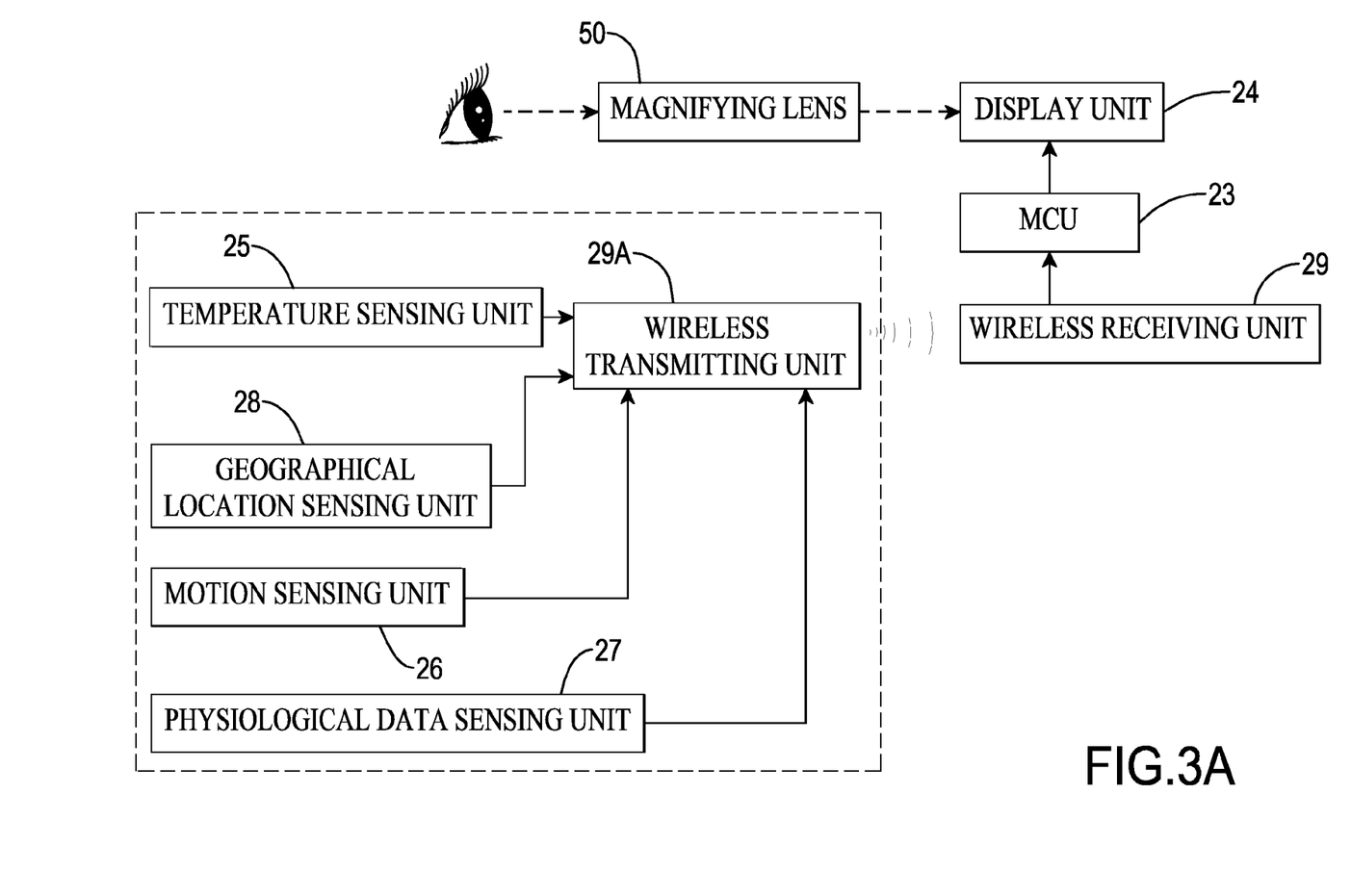
FIG. 3A is a functional block diagram of an embodiment of a head-mount display with exercise information displayed thereon in accordance with the present invention.

The wireless receiving unit 29 is further wirelessly connected to a wireless transmitting unit 29A to wirelessly receive exercise information wirelessly transmitted from the wireless transmitting unit 29A. The wireless transmitting unit 29A is connected to a temperature sensing unit 25, a motion sensing unit 26, a physiological data sensing unit 27, and a geographical location sensing unit 28. The temperature sensing unit 25 serves to sense an ambient temperature and a user's body temperature upon exercising. The motion sensing unit 26 serves to detect a moving speed or a moving displacement of the user upon exercising. The physiological data sensing unit 27 serves to sense a heartbeat rate or other physiological data of the user upon exercising. The geographical location sensing unit 28 serves to detect a location and an altitude where the user is positioned upon exercising. Thus, the multiple pieces of exercise information include the ambient temperature, the body temperature, the moving speed or displacement, heartbeat rate or other physiological data, and location and altitude of the user.

Figure 3B:
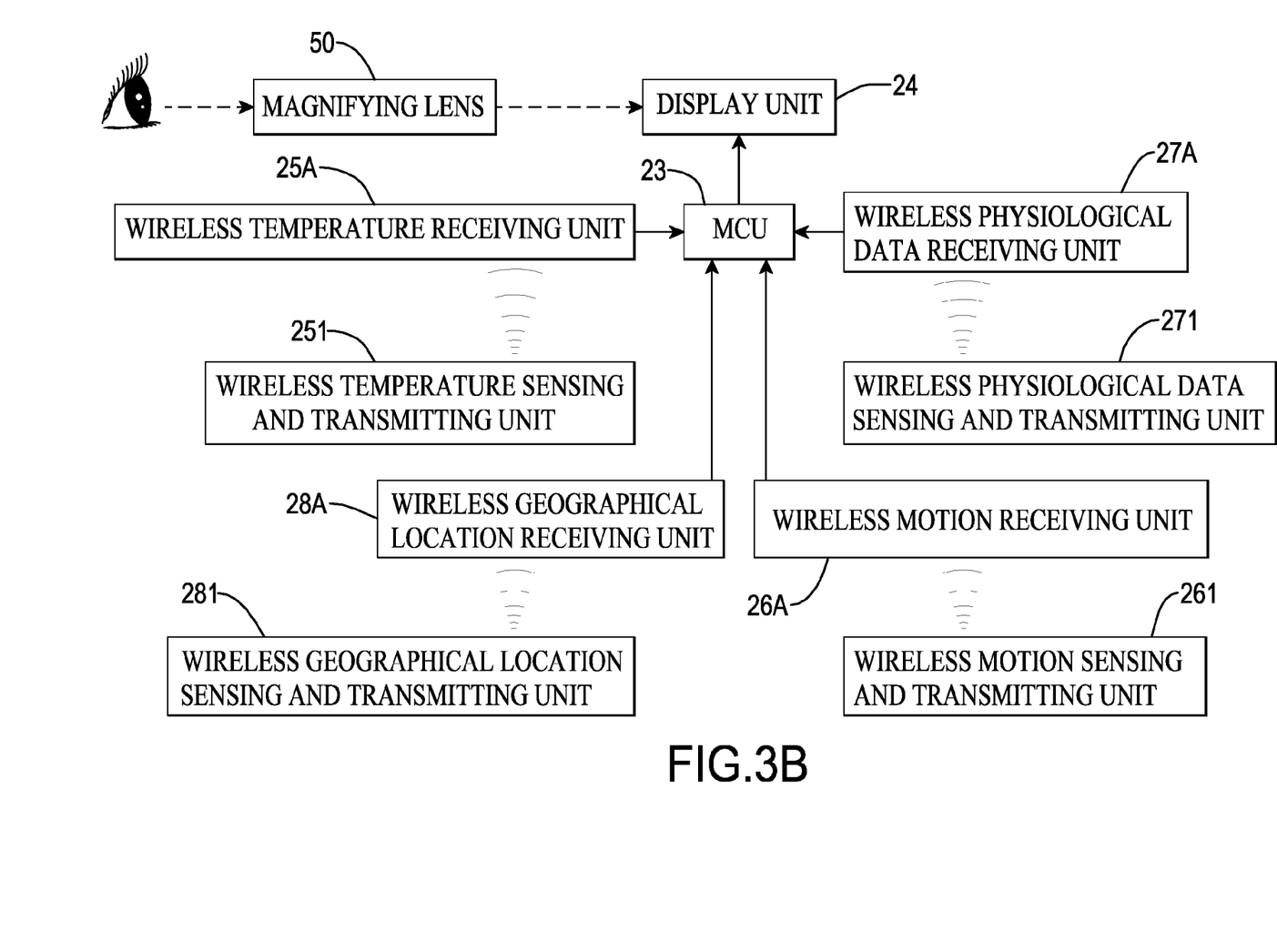
FIG. 3B is a functional block diagram of another embodiment of a head-mount display with exercise information displayed thereon in accordance with the present invention.

With reference to FIG. 3B, another embodiment of a head-mount display in accordance with the present invention is shown, and the present embodiment is substantially the same as the foregoing embodiment except that there are multiple wireless receiving units 29 directly receiving wireless signals transmitted from corresponding sensing units and the wireless transmitting unit 29A is no longer needed. The MCU 23 is connected to a wireless temperature receiving unit 25A, a wireless motion receiving unit 26A, a wireless physiological data receiving unit 27A, and a wireless geographical location receiving unit 28A. The wireless temperature receiving unit 25A serves to receive a signal indicative of an ambient temperature or a body temperature of the user upon exercising transmitted from a wireless temperature sensing and transmitting unit 251. The wireless motion receiving unit 26A serves to receive a signal indicative of a moving speed or a moving distance of the user upon exercising transmitted from a wireless motion sensing and transmitting unit 261. The wireless physiological data receiving unit 27A serves to receive a signal indicative of a heartbeat rate or other physiological data of the user upon exercising transmitted from a wireless physiological data sensing and transmitting unit 271. The wireless geographical location receiving unit 28A serves to receive a signal indicative of a location and an altitude of the user upon exercising transmitted from a wireless geographical location sensing and transmitting unit 281. The multiple wireless receiving units include, but are not limited to, the foregoing wireless temperature receiving unit 25A, wireless motion receiving unit 26A, wireless physiological data receiving unit 27A, and wireless geographical location receiving unit 28A. For practical implementation, the MCU 23 may be connected to one or more wireless receiving units. For example, the MCU 23 is only connected to the wireless geographical location receiving unit 28A, is connected to the wireless motion receiving unit 26A and the wireless physiological data receiving unit 27A, or is connected to the wireless temperature receiving unit 25A, the wireless physiological data receiving unit 27A, and the wireless geographical location receiving unit 28A.

Figure 4:
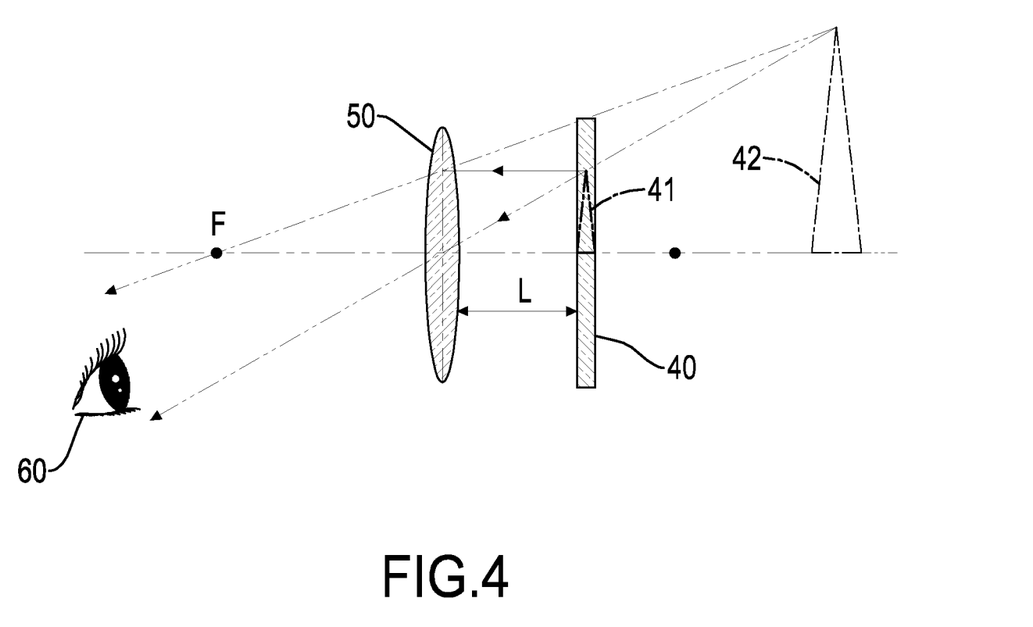
FIG. 4 is an operating schematic view showing a concept of forming a virtual image in accordance with the present invention.

From the foregoing description, the multiple pieces of exercise information of the user can be viewed from the display screen 40 through the magnifying lens 50. To explain a concept of forming a virtual image between the display screen 40 and the magnifying lens 50, with reference to FIG. 4, the magnifying lens 50 and the display screen 40 are placed in front of a user's eyes 60 with the magnifying lens 50 situated between the display screen 40 and the user's eyes 60. The magnifying lens 50 is spaced apart from the display screen 40 by a gap L. The display screen 40 displays an object 41. According to the imaging concept, light rays of the object 41 emitted from the display screen 40 respectively pass through the focal point and the optical center of the magnifying lens 50, and an enlarged virtual image of the object 41 appears behind the display screen 40. The magnifying lens 50 pertains to a converging magnifying lens.

Figure 5:
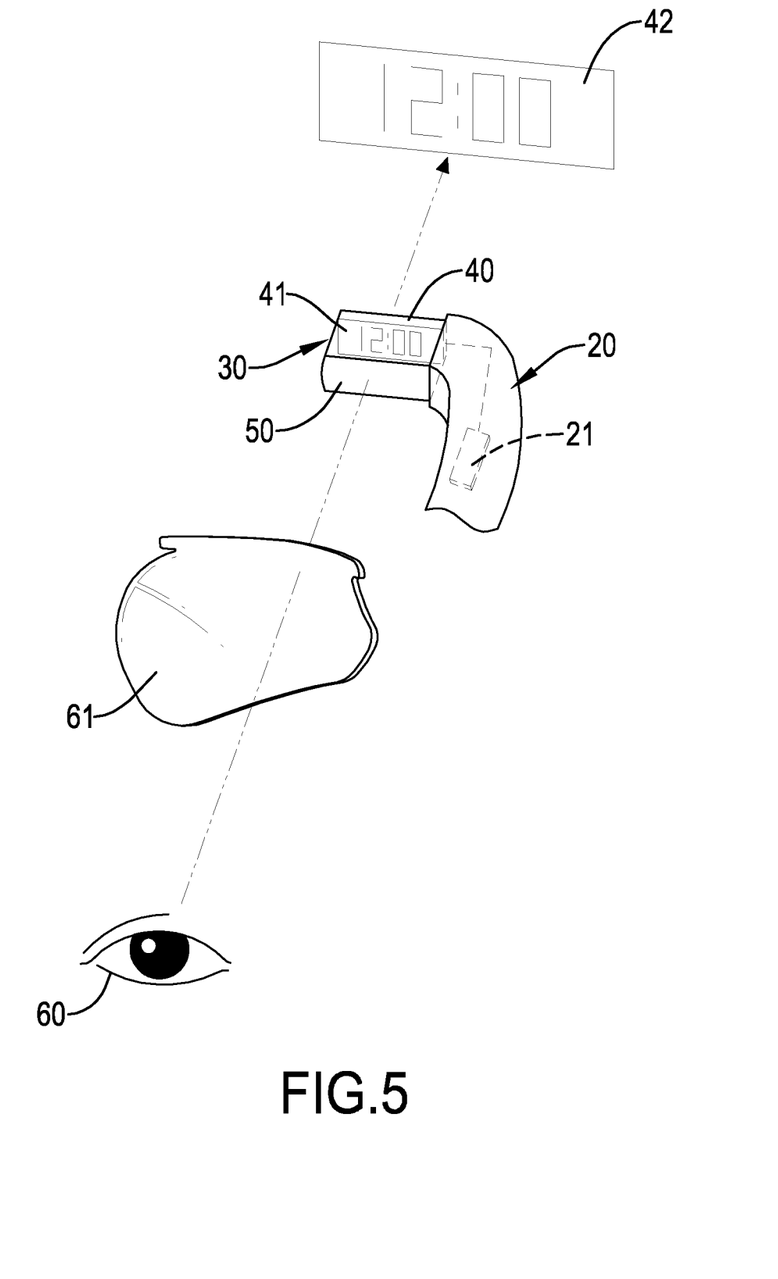
FIG. 5 is an operating schematic view showing how a virtual image can be seen by a user wearing a head-mount display in accordance with the present invention.

With reference to FIG. 5, the imaging concept and operation of the present application are described as follows. According to the foregoing imaging concept, the information box 20 drives the display screen 40 in the transparent body 30 to display the object 41 thereon. The object 41 may be a set of numerical information. The frame 10 further has a vision lens 61 located between the user's eyes 60 and the magnifying lens 50 of the transparent body 30. Based on the foregoing imaging concept, the user's eyes 60 can see a virtual image 42 of the object 41 behind the display screen 40. As the virtual image 42 and the vision lens 61 are located on an identical optical axis, the user's eyes 60 can see the set of numerical information through the vision lens 61 within a visual range for the user to watch the set of numerical information upon exercising. Accordingly, the present invention increases not only operational convenience but also the amount of information to be displayed, rendering higher space utilization efficiency of the display screen 40.

Figure 6:
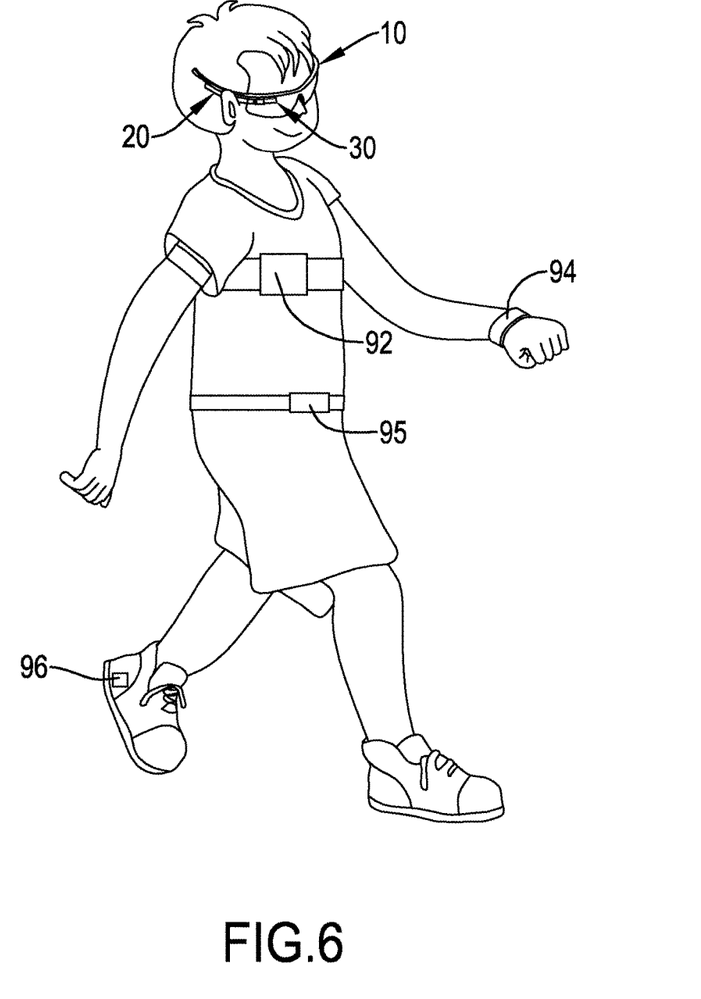
FIG. 6 is an operating schematic view of a jogger wearing the head-mount display in FIG. 1 and multiple external sensors in communication with the head-mount display.
Figure 6A:
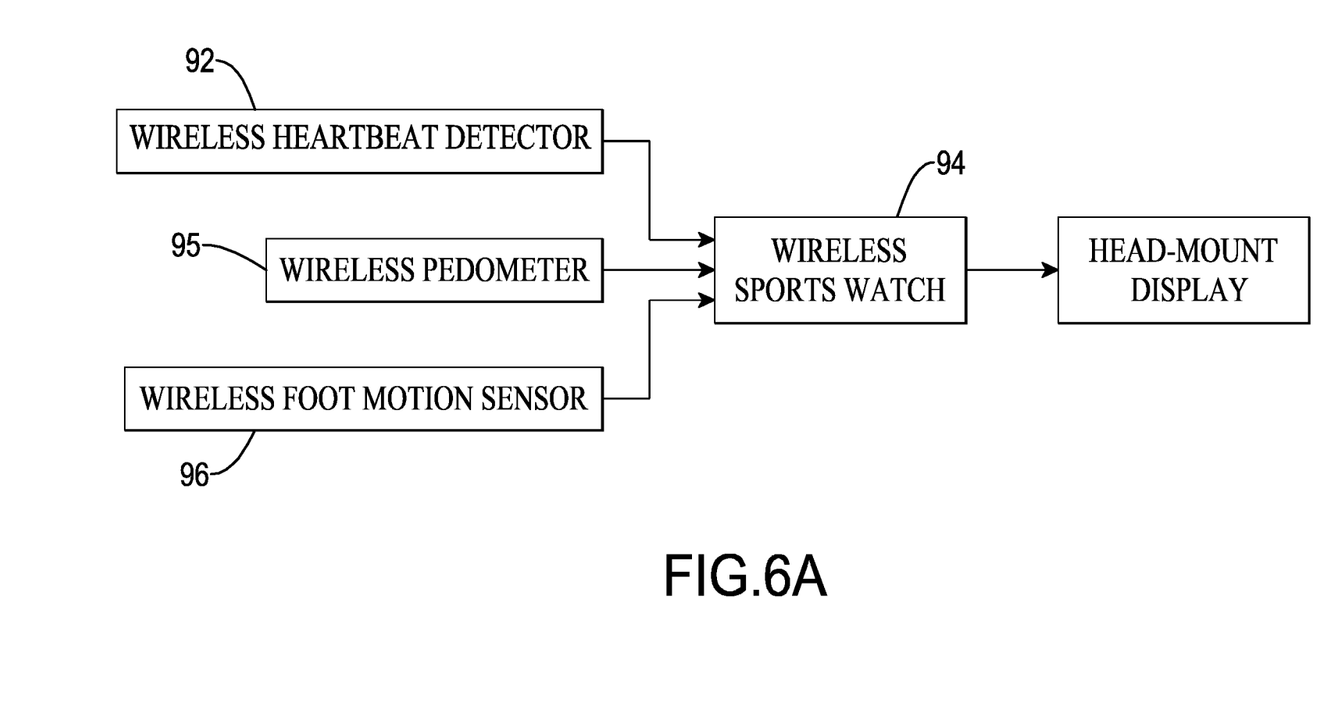
FIG. 6A is a functional block diagram of the head-mount display and the multiple external sensors in FIG. 6.
Figure 7:
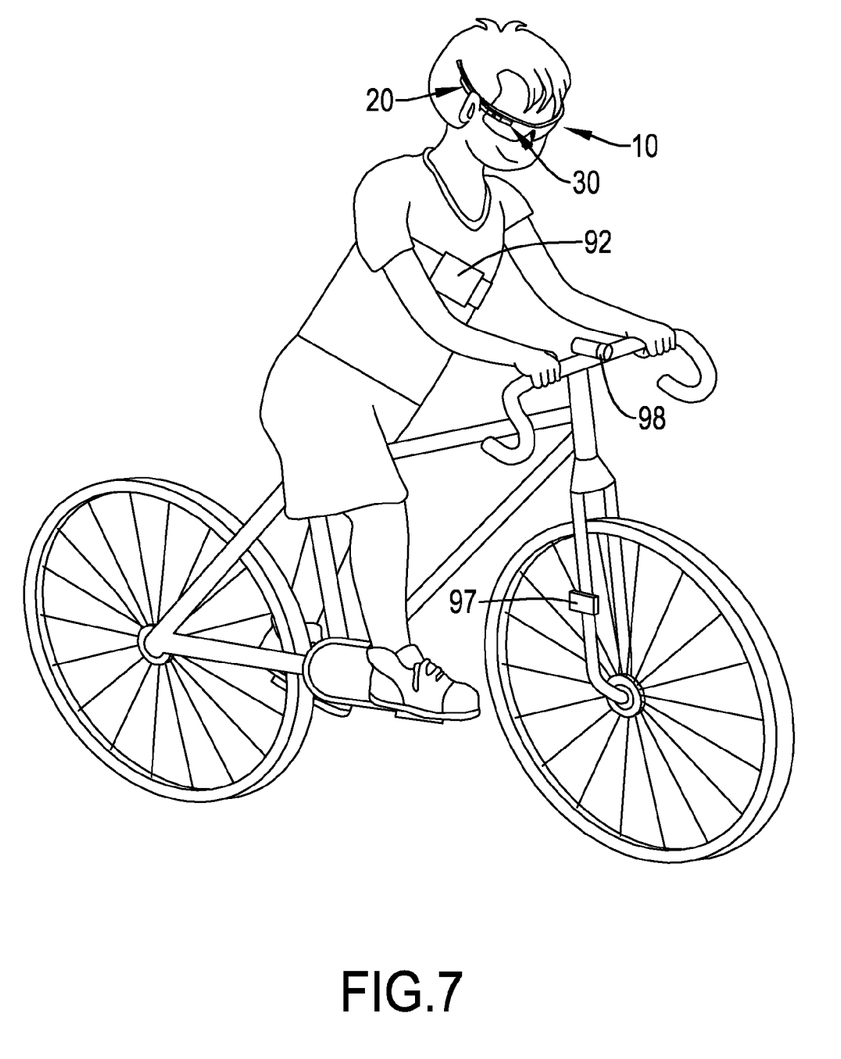
FIG. 7 is an operating schematic view of a cyclist wearing the head-mount display in FIG. 1 and multiple external sensors in communication with the head-mount display.

With reference to FIGS. 6 and 7, the head-mount display is worn by a jogger and a cyclist. The frame 10 of the head-mount display is worn on the head of the user with the information box 20 and the transparent body 30 securely mounted on the temple of the frame 10. The information box 20 serves to receive signals transmitted from various sensing units mounted on different portions, such as wrist, arm, chest, waist, shoes and the like, of the user and things that the user wears. With reference to FIG. 6A, the various sensing units include a wireless heartbeat detector 92, a wireless sports watch 94, a wireless pedometer 95, and a wireless foot motion sensor 96. The wireless sports watch 94 is worn around the user's wrist. The wireless heartbeat detector 92 is mounted on the chest of the user. The wireless pedometer 95 is mounted on the waist of the user. The wireless foot motion sensing unit 96 is mounted on a shoe of the user. After the wireless sports watch 94 wirelessly receives the sensing signals wirelessly transmitted from the wireless heartbeat detector 92, the wireless pedometer 95, and the wireless foot motion sensor 96, the wireless sports watch 94 further wirelessly transmits the sensing signals indicative of exercise information of the user to the head-mount display worn on the head of the user.

Figure 7A:
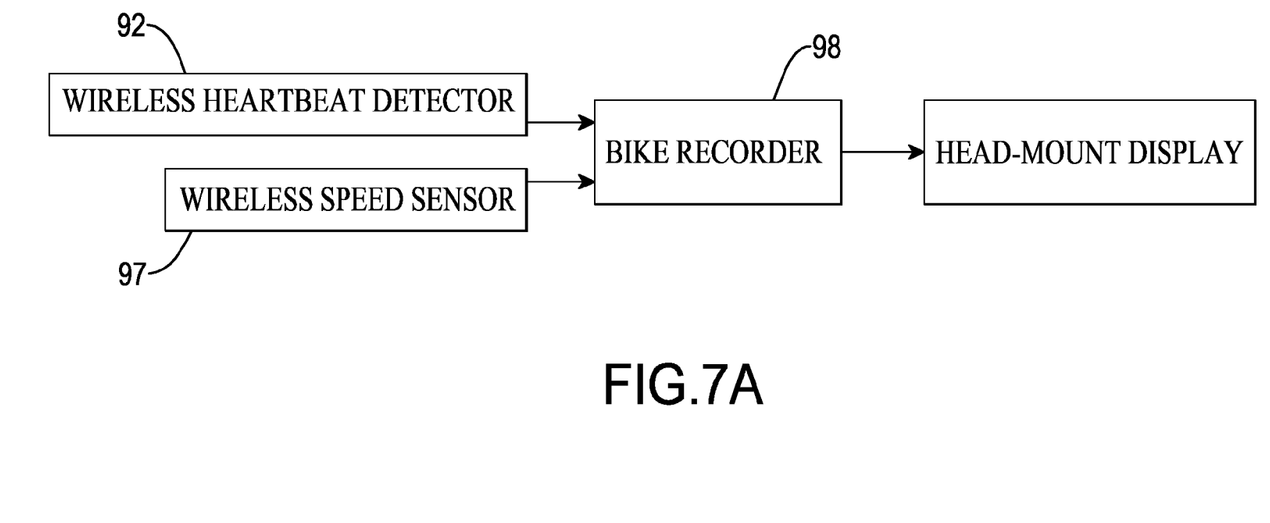
FIG. 7A is a functional block diagram of the head-mount display and the multiple external sensors in FIG. 7.

With reference to FIG. 7A, the various sensing units include a wireless heartbeat detector 92, a wireless speed sensor 97, and a bike recorder 98. The bike recorder 98 is mounted on a handlebar of a bicycle. The wireless heartbeat detector 92 is mounted on the chest of the user. The wireless speed sensor 97 is mounted on a front fork/rear fork of a frame of the bicycle. During cycling, the bike recorder 98 wirelessly receives sensing signals wirelessly transmitted from the wireless heartbeat detector 92 and then wirelessly transmits the sensing signals to the head-mount display worn on the head of the user.

Figure 8:
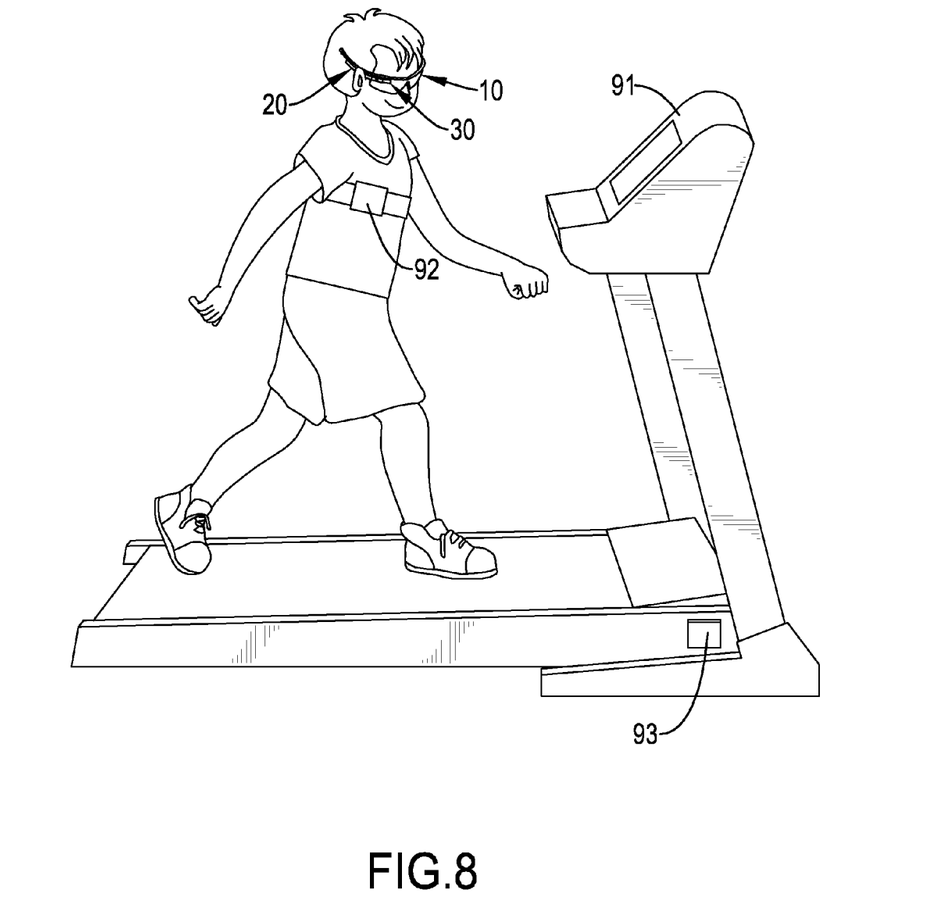
FIG. 8 is an operating schematic view of a user of a treadmill wearing the head-mount display in FIG. 1 and multiple external sensors in communication with the head-mount display.
Figure 8A:
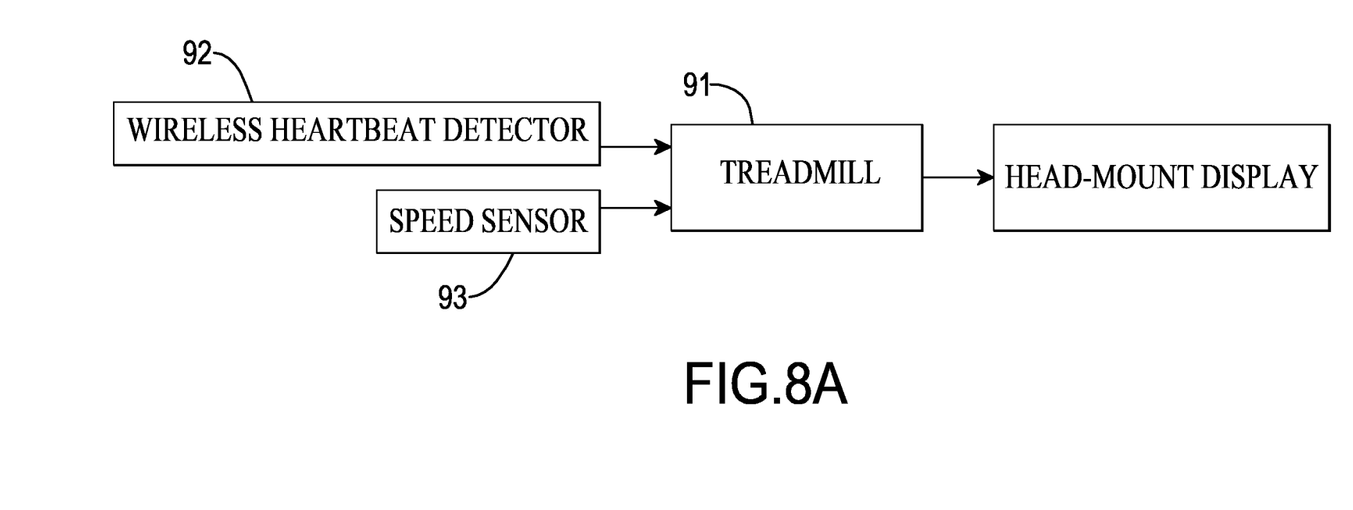
FIG. 8A is a functional block diagram of the head-mount display and the multiple external sensors in FIG. 8.

In addition to outdoor exercise, the head-mount display can be applied to indoor exercise equipment, such as a treadmill. With reference to FIG. 8, when the user is exercising on a treadmill, the information box 20 can simultaneously and wirelessly receive sensing signals wirelessly transmitted from various sensing units mounted on the user and sensing signals wirelessly transmitted from all sensing units mounted on the indoor exercise equipment. With reference to FIG. 8A, some of the various sensing units mounted on the indoor exercise equipment and the user include a treadmill 91, a wireless heartbeat detector 92, and a speed sensor 93. The wireless sports watch 94 is worn around the user's wrist. The wireless heartbeat detector 92 is mounted on the user's chest. The speed sensor 93 is mounted in the treadmill 91. The speed sensor 93 and the wireless heartbeat detector 92 respectively detect speed information of the treadmill 91 and the user's heartbeat rate information, and further transmit the speed information and the heartbeat information to the head-mount display for the user's reference. In collaboration with the exercise functions provided by the treadmill 91, the head-mount display can strengthen users' effect of exercise. Additionally, besides the convenience in demonstrating information, the information box can further enhance the display screen 40 in terms of the space utilization efficiency and the effect of recognizing information.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A head-mount display with exercise information displayed thereon, comprising:
    a frame having two temples respectively connected to two ends of the frame;
    an information box mounted on one of the two temples, and having:
        at least one wireless receiving unit wirelessly detecting multiple pieces of exercise information associated with a user; and
        a display unit displaying the multiple pieces of exercise information in a form of icon or text message;
    a transparent body having:
        an inner sidewall facing an upper portion of an angle of view of the user;
        an outer sidewall opposite to the inner sidewall;
        a first fixing portion formed on an inner side of the outer sidewall; and
        a second fixing portion formed on an inner side of the inner sidewall;
    a display screen securely joined to the first fixing portion of the transparent body contacting and matching a surface of the display screen, electrically connected to the display unit, and displaying images that are viewable to the user through the inner sidewall of the transparent body; and
    a magnifying lens securely joined to the second fixing portion of the transparent body contacting and matching a surface of the magnifying lens, and serving to enlarge the multiple pieces of exercise information displayed on the display screen to form an enlarged virtual image corresponding to the pieces of exercise information behind the display screen when light rays emitted from the display screen respectively pas through the focal point and the optical center of the magnifying lens.

2. The head-mount display as claimed in claim 1, wherein the information box has:
    a substrate mounted inside the information box, and having the at least one wireless receiving unit and the display unit mounted on the substrate; and
    a rechargeable battery mounted inside the information box and connected to the substrate.

3. The head-mount display as claimed in claim 2, wherein the substrate of the information box further has a microcontroller unit (MCU) electrically connected to the at least one wireless receiving unit and the display unit.

4. The head-mount display as claimed in claim 3, wherein the at least one wireless receiving unit wirelessly receives signals wirelessly transmitted from a temperature sensing unit, a motion sensing unit, a physiological data sensing unit, and a geographical location sensing unit, the temperature sensing unit serves to sense an ambient temperature and a body temperature of the user upon exercising, the motion sensing unit serves to detect a moving speed or a moving displacement of the user upon exercising, the physiological data sensing unit serves to sense a heartbeat rate or other physiological data of the user upon exercising, and the geographical location sensing unit serves to detect a location and an altitude where the user is positioned upon exercising.

5. The head-mount display as claimed in claim 4, wherein the multiple pieces of exercise information include the ambient temperature, the body temperature, the geographical location and altitude, the moving speed or displacement, and the heartbeat rate or other physiological data of the user.

6. A display device, comprising:
    an information box having:
        at least one wireless receiving unit, mounted inside the information box, and wirelessly detecting multiple pieces of exercise information associated with a user; and
        a display unit mounted inside the information box, and displaying the multiple pieces of exercise information in a form of icon or text message; and
    a transparent body having:
        an inner sidewall facing an upper portion of an angle of view of the user;
        an outer sidewall opposite to the inner sidewall;
        a first fixing portion formed on an inner side of the outer sidewall; and
        a second fixing portion formed on an inner side of the inner sidewall;
    a display screen securely joined to the first fixing portion of the transparent body contacting and matching a surface of the display screen, electrically connected to the display unit, and displaying images that are viewable to the user through the inner sidewall of the transparent body; and
    a magnifying lens securely joined to the second fixing portion of the transparent body contacting and matching a surface of the magnifying lens, and serving to enlarge the multiple pieces of exercise information displayed on the display screen to form an enlarged virtual image corresponding to the pieces of exercise information behind the display screen when light rays emitted from the display screen respectively pas through the focal point and the optical center of the magnifying lens.

7. The display device as claimed in claim 6, wherein the information box has:
    a substrate mounted inside the information box, and having the at least one wireless receiving unit and the display unit mounted on the substrate, and a microcontroller unit (MCU) electrically connected to the at least one wireless receiving unit and the display unit; and
    a rechargeable battery mounted inside the information box and connected to the substrate.

8. The display device as claimed in claim 7, wherein
    the at least one wireless receiving unit wirelessly receives signals wirelessly transmitted from a temperature sensing unit, a motion sensing unit, a physiological data sensing unit, and a geographical location sensing unit, the temperature sensing unit serves to sense an ambient temperature and a body temperature of the user upon exercising, the motion sensing unit serves to detect a moving speed or a moving displacement of the user upon exercising, the physiological data sensing unit serves to sense a heartbeat rate or other physiological data of the user upon exercising, and the geographical location sensing unit serves to detect a location and an altitude where the user is positioned upon exercising; and the multiple pieces of exercise information include the ambient temperature, the body temperature, the geographical location and altitude, the moving speed or displacement, and the heartbeat rate or other physiological data of the user.

\* \* \* \* \*